March 17, 1925.  1,530,369
E. JACKSON
WHEEL
Filed July 28, 1924   3 Sheets-Sheet 2
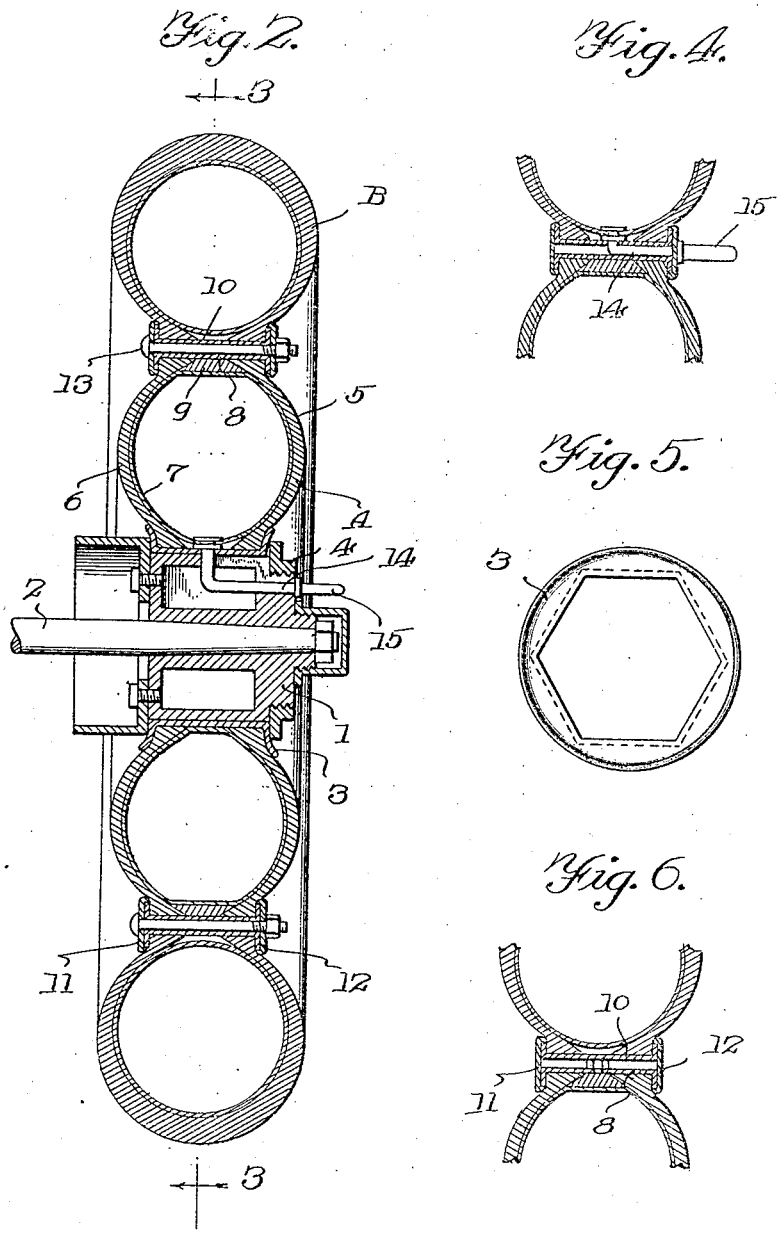
Edwin Jackson
INVENTOR
BY Victor J. Evans
ATTORNEY
WITNESS:

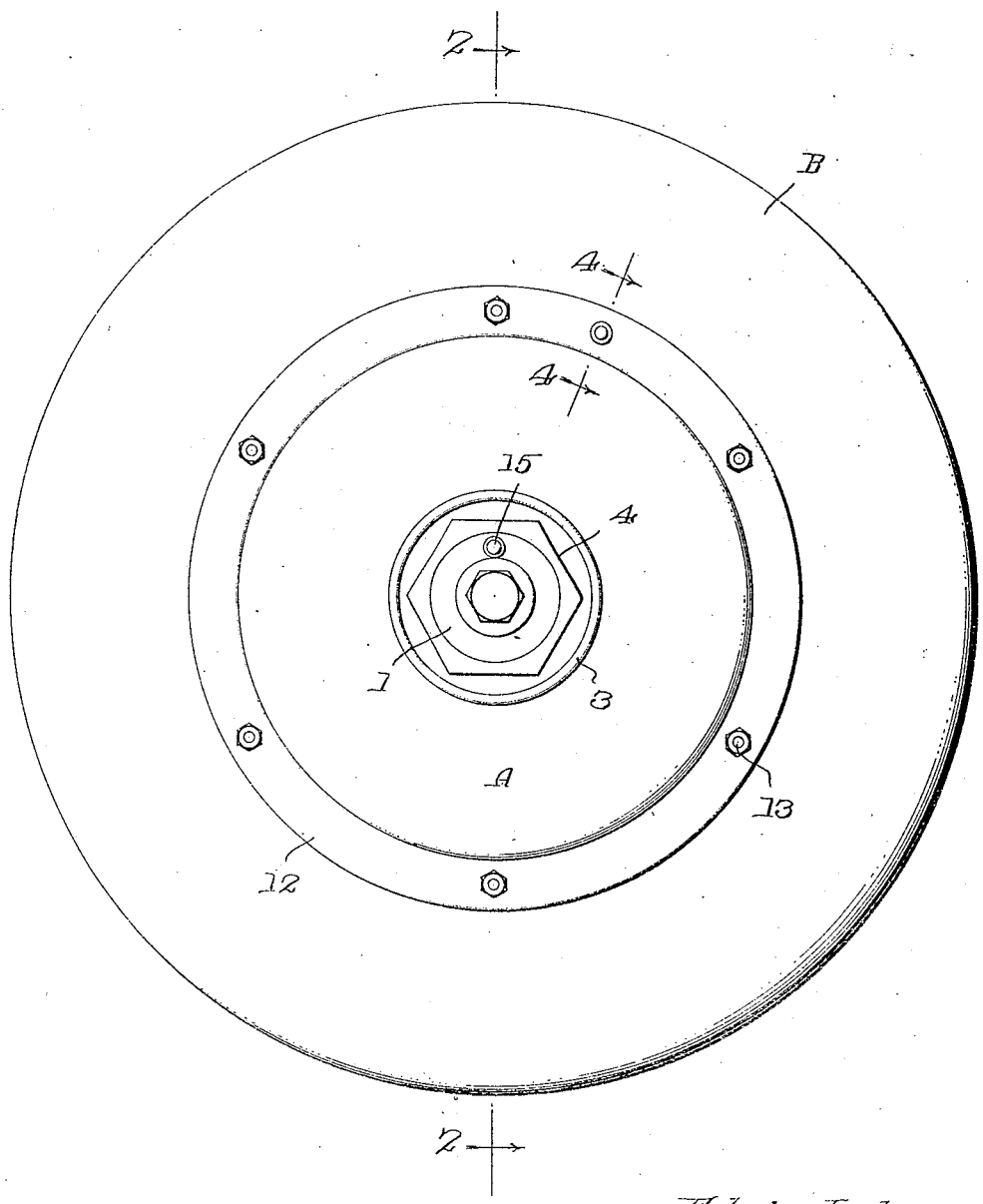

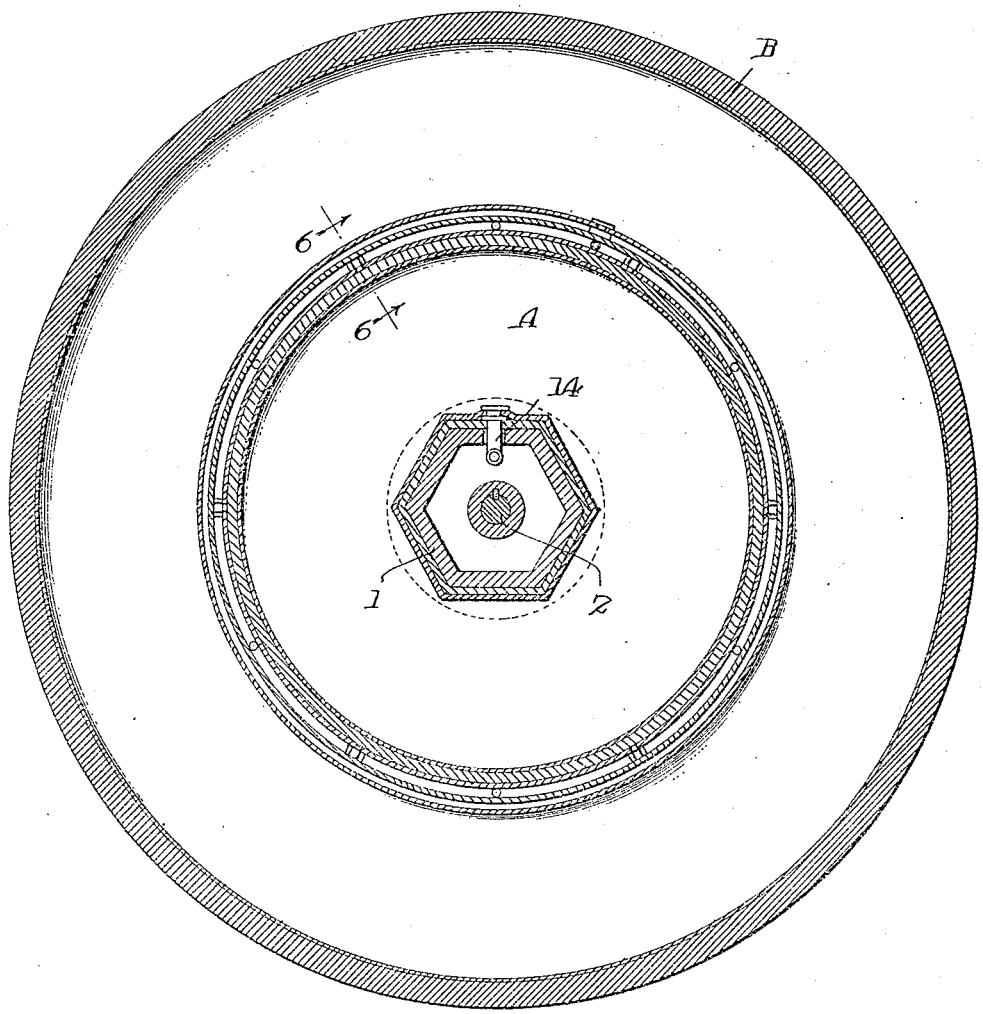

Patented Mar. 17, 1925.

1,530,369

UNITED STATES PATENT OFFICE.

EDWIN JACKSON, OF INDIANAPOLIS, INDIANA.

WHEEL.

Application filed July 28, 1924. Serial No. 728,753.

*To all whom it may concern:*

Be it known that I, EDWIN JACKSON, a citizen of the United States, residing at Indianapolis, in the county of Marion and State of Indiana, have invented new and useful Improvements in Wheels, of which the following is a specification.

This invention relates to improvements in wheels for vehicles, the general object of the invention being to provide a plurality of pneumatic tires for each wheel with means for connecting one tire to a hub member and another tire to the outer circumference of the first tire, thus improving the riding qualities of the wheel.

Another object of the invention is to so arrange the parts that the tires can be easily and quickly removed and replaced to enable them to be repaired or removed.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the improved wheel.

Figure 2 is a section on line 2—2 of Figure 1.

Figure 3 is a section on line 3—3 of Figure 2.

Figure 4 is a section on line 4—4 of Figure 1.

Figure 5 is a side view of the inner rim.

Figure 6 is a section on line 6—6 of Figure 3.

In these views, 1 indicates a hub which is adapted to be placed on the spindle 2 of the vehicle and 3 indicates an inner rim which is held on the hub by the nut 4 which is threadedly engaged to the hub. The rim and exterior of the hub are of hexagonal shape in cross section, as shown, with the nut engaging a threaded circular part of the hub to hold the rim in place. An inner tire A is adapted to engage the rim 3 and the inner part of this tire is of hexagonal shape to conform to the shape of the rim. This tire is composed of two sections 5 and 6, each section being beaded at each edge and these sections enclose the tube 7, the outer beads of the sections being engaged by the rim 8. A ring member 9, of substantially wedge shape in cross section, is used for holding the outer beads in the rim 8 by holding the beads spread apart. An outer tire B of usual construction is supported by the rim 10. This rim is placed over the rim 8 and the two rims 8 and 10 are held together by the rings 11 and 12 which engage the flanges of the rim and these rings are held in clamped engagement with the rims by the bolts 13 which pass through the two rings and through the space between the rims. Each tire is provided with an angle-shaped valve stem 14, the stem for the outer tire passing through the space between the rims and through a hole in the outer ring while the stem for the inner tire passes through an opening in the hub. These stems are provided with the usual dust caps 15.

The parts of the inner tire A are assembled on the inner rim 3 and then the outer rim 8 is put in place and then the inner tube of this tire is inflated. Then the outer tire B is placed in its rim and the same placed over the rim 8. Then the rings 11 and 12 are put in position, the bolts 13 are passed therethrough and the nuts applied and tightened.

It will thus be seen that I have provided a wheel with a double tire so as to increase the resiliency and shock absorbing qualities of the wheel. The parts are easily assembled and taken apart for repair purposes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wheel of the class described comprising a hub portion, an inner pneumatic tire, a rim carrying the same, a nut part on the hub portion for holding the rim thereon, an outer rim on the tire, an outer tire, a rim carrying the same, ring members and bolts for clamping the outer rim of the inner tire and the rim of the outer tire together.

In testimony whereof I affix my signature.

EDWIN JACKSON.